Dec. 17, 1968 S. L. POLLARD 3,416,707

VALVE, AEROSOL POLYMER DISPENSER, AND METHOD

Filed Sept. 20, 1966 3 Sheets-Sheet 1

INVENTOR.
STEPHEN LEROY POLLARD
BY
*Lyon & Lyon*
ATTORNEYS

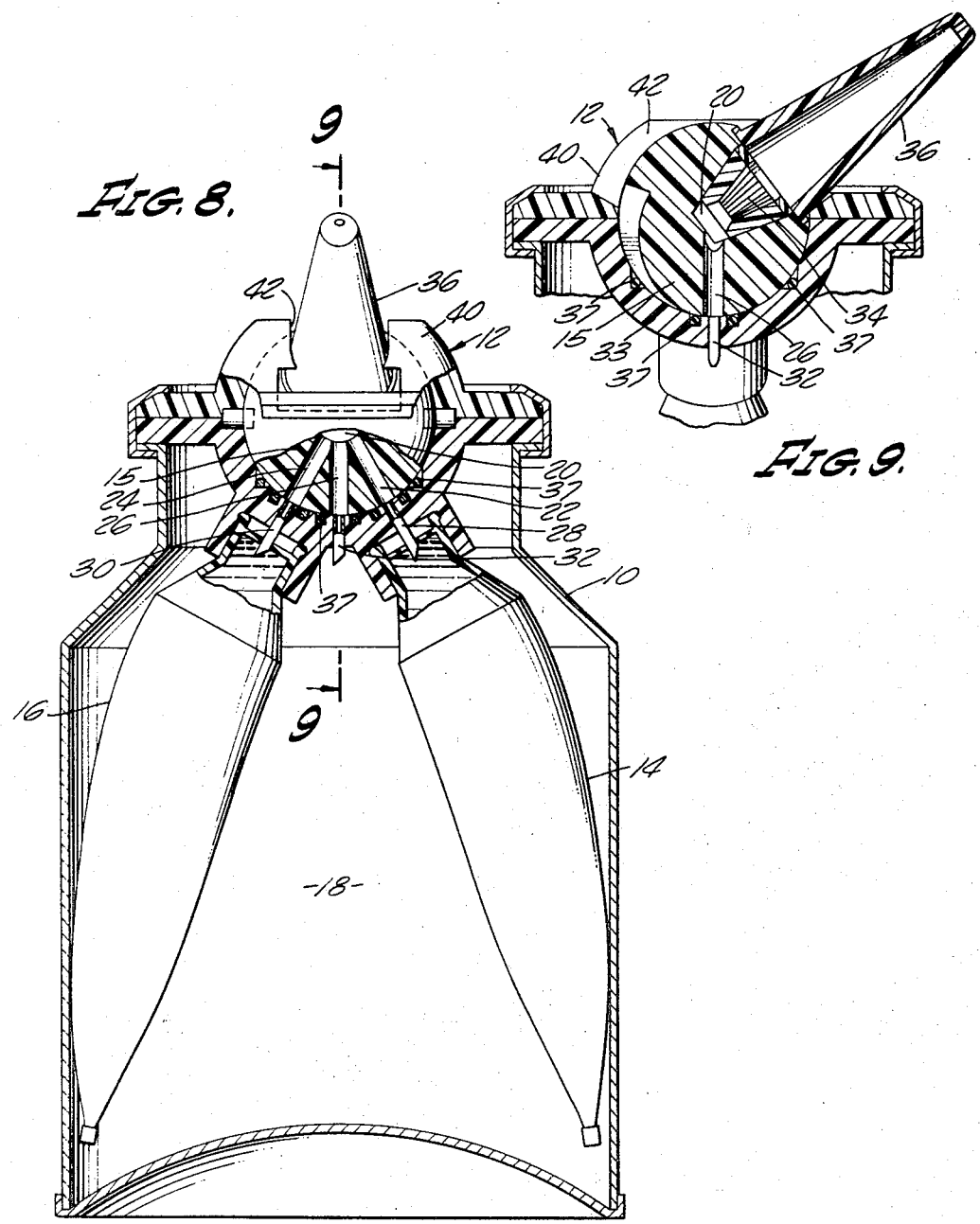

Dec. 17, 1968    S. L. POLLARD    3,416,707
VALVE, AEROSOL POLYMER DISPENSER, AND METHOD
Filed Sept. 20, 1966    3 Sheets-Sheet 3

INVENTOR.
STEPHEN LEROY POLLARD
BY Lyon & Lyon
ATTORNEYS

United States Patent Office 3,416,707
Patented Dec. 17, 1968

3,416,707
VALVE, AEROSOL POLYMER DISPENSER, AND METHOD
Stephen L. Pollard, 405 Holly Ave., Monrovia, Calif. 91016
Continuation-in-part of abandoned application Ser. No. 568,480, July 28, 1966. This application Sept. 20, 1966, Ser. No. 587,360
14 Claims. (Cl. 222—1)

ABSTRACT OF THE DISCLOSURE

This patent describes a method of mixing complementary reactive polymer-forming materials which comprises forcing separate streams of different complementary reactive polymer-forming materials under pressure into a common zone to partially mix said materials, forcing partially mixed materials under said pressure into a second zone, subjecting said materials while in said second zone to a whirlpool-like mixing action while still under the influence of said pressure and discharging said materials to the atmosphere in a thoroughly interblended state. This patent further describes a novel valve apparatus comprising a valve seat having a hemispherical opening therein, received in said hemispherical opening a rotatable ball, said ball and said valve seat each having passages therethrough which can be brought into communication by rotation of said ball, the passages in said ball leading to the inlet of a common mixing zone, an outlet for said mixing zone for communicating with a vortex, a vortex having a plurality of similar spaced curved grooves running along the length of its interior surface, and a dispensing nozzle communicating with said vortex. This patent further describes a noval self-contained aerosol dispenser comprising an aerosol can capable of containing a pressurizing gas, two deformable containers within the can for holding complementary reactive polymer-forming ingredients. The top closure of said aerosol can is provided with the novel valve described above.

---

This application is a continuation-in-part application of applicant's copending U.S. application Ser. No. 568,480, filed July 28, 1966, now abandoned, the disclosure of which is expressly incorporated herein.

This invention relates to a novel ball valve structure, to a novel aerosol can dispenser adapted to dispense complementary reactive materials in the form of a mixed effluent, and to a novel method for the mixing of complementary reactive polymer-forming ingredients.

Various devices have been proposed for the dispensing of polymers including reactive systems. Where reactive materials are involved, it is generally necessary to isolate the reactants from each other until it is desired to apply the polymer. At the time of dispensing, the reactants must be combined and mixed. The dispensing devices always have various pockets and passages forming part of the combining and mixing zones which tend to retain small amounts of the partially or totally blended reactants. These mixtures will polymerize in place if not promptly removed, to form clogging residues. In the prior art devices, the arrangement of the structure was such that the residual reactive mixtures could not be quickly removed short of dismantling of the entire device, a normally impractical alternative. Because of this characteristic, the known devices are limited to "one-shot" operation. In other words, all of the reactive polymer-forming materials must be dispensed in a single operation. Attempts at subsequent operations failed because of the intervening formation of clogging polymer residues.

For commercial appeal, particularly for sales to the homeowner and hobby markets, it is apparent that a "multi-shot" polymer dispenser would be of great value. The multi-shot device could be utilized repeatedly to dispense polymer and yet would have a prolonged shelf-life between usages. The long standing need in this technology has been for an apparatus capable of multi-shot polymer dispensing. The present invention is broadly directed to the provision of a novel means and method of satisfying this need.

It is a major object of this invention to provide a novel valve structure.

It is an additional object of my invention to provide a novel aerosol polymer dispenser.

Related to the immediately foregoing object, it is an object to provide an aerosol polymer dispenser which can be easily cleaned after each use to permit repeated use thereof.

In another aspect, it is a significant object of the instant invention to furnish a new method of combining, mixing and dispensing reactive polymer-forming ingredients.

These and other objects and advantages of my invention will become apparent from the more detailed description which follows taken in conjunction with the accompanying drawings in which:

FIGURE 8 is a sectional view of an aerosol can equipped with one form of the novel valve of the present invention and showing the connection of the valve to the containers for the complementary reactive polymer-forming ingredients.

FIGURE 9 is a sectional view taken along the line 9—9 of FIGURE 8.

Figure 1:
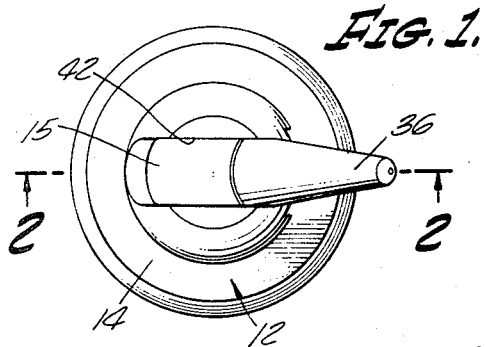
FIGURE 1 is a top view of one embodiment of the novel valve structure of the present invention.
Figure 4:
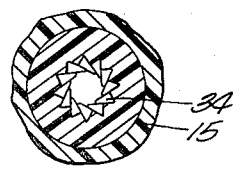
FIGURE 4 is a sectional view taken through the mixing vortex portion of the valve of this invention.

Briefly, the present invention generally comprises the method of mixing complementary reactive polymer-forming materials which comprises forcing separate streams of different complementary reactive polymer-forming materials under pressure into a common zone to partially mix said materials, forcing said partially mixed materials under said pressure into a second zone, subjecting said materials while in said second zone to a whirlpool-like mixing action while still under the influence of said pressure and discharging said materials to the atmosphere in a thoroughly interblended state. The invention additionally includes a novel valve apparatus comprising a valve seat having a hemispherical opening therein, received in said hemispherical opening a rotatable ball, said ball and said valve seat each having passages therethrough which can be brought into communication by rotation of said ball, the passages in said ball leading to the inlet of a common mixing zone, a common mixing zone, an outlet for said mixing zone for communicating with a vortex, a vortex having a plurality of similar spaced curved grooves running along the length of its interior surface, and a dispensing nozzle communicating with said vortex; and a self-contained aerosol polymer dispenser equipped with said valve.

Referring to the drawing in more detail, can 10 indicates the aerosol generally. The can 10 is provided with a ball valve 12 for communicating containers 14 and 16, and the interior 18 of can 10, with mixing zone 20 by appropriate alignment of passages 22, 24 and 26 in the ball 15 of ball valve 12 with passages 28, 30 and 32 in valve seat 33 leading to containers 14, 16 and interior 18, respectively. The mixing zone 20 is provided with a vortex 34 which causes swirling to yield a homogeneous effluent at the tip of nozzle 36. The vortex 34 is of utmost importance in bringing about the interblending of the materials passing therethrough. The vortex 34 generally comprises a passage of gradually diminishing inside diameter containing a plurality of uniformly spaced, normally "V-shaped" grooves on its interior surface each of which follows a similar curved path as it proceeds lengthwise through the vortex. These grooves are primarily for the purpose of creating the desired whirlpool effect.

Gaskets 37 are provided between ball 15 and seat 33 and around the entrance to passages 28, 30 and 32 to maintain a pressure tight seal. The nozzle 36 may be integral with ball 15, or may be fitted thereto by a snap fit between a protruding external ring on the nozzle and an undercut in the ball as shown in the drawing.

The containers 14 and 16 are made of plastic or any other deformable material. These containers normally contain two different complementary reactive materials, i.e., a polyurethane prepolymer and a catalyst, or an epoxy polymer and a polyamine catalyst. The interior 18 of can 10 is filled with a pressurizing material or propellant such as Freon, butane, etc., which is held by can 10 partially in liquid or solid form under its own vapor pressure and prevailing temperature, normally from 30° to 125° F. The pressurizing material may be charged or injected into the can 10 at the top prior to the insertion of valve 12 by techniques already known. The effect of the pressurizing material is to maintain the containers 14 and 16 under a squeezing force in a manner similar to a toothpaste tube.

Figure 2:
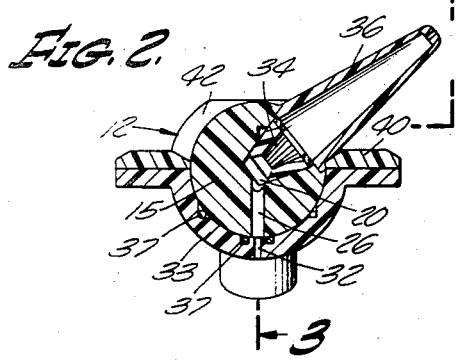
FIGURE 2 is a sectional view taken along the line 2—2 of FIGURE 1.
Figure 3:
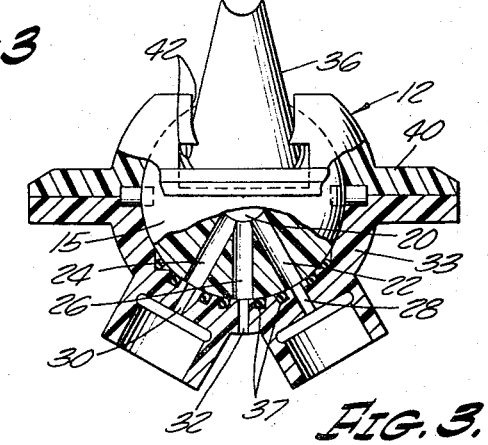
FIGURE 3 is a partial sectional view taken along the line 3—3 of FIGURE 2.
Figure 5:
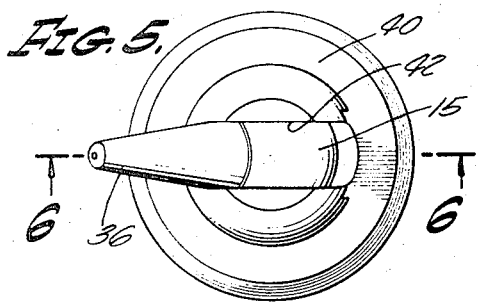
FIGURE 5 is a top view of one embodiment of the valve of the present invention with the ball and dispensing tip rotated to a position where the valve and the passages therein are adapted to be cleaned.
Figure 7:
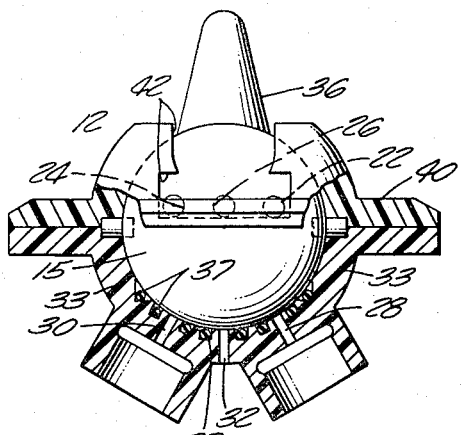
FIGURE 7 is a sectional view taken along the line 7—7 of FIGURE 6.
Figure 6:
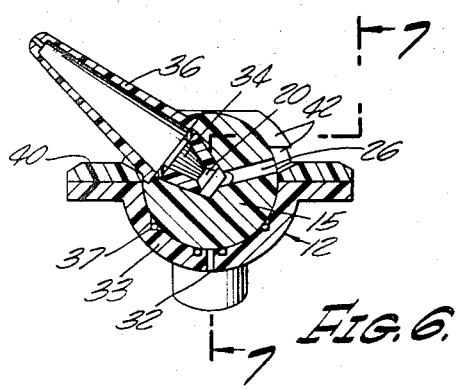
FIGURE 6 is a section taken along the line 6—6 of FIGURE 5.

In operation, valve 12 is arranged as shown in FIGURES 1 through 3 inclusive to provide the alignment shown in these drawings. The squeezing force on containers 14 and 16 causes the contents thereof to be forced into the mixing zone 20 where they begin to react with each other and are mixed and dispensed under the influence of the propellant escaping through passages 26 and 32. The vortex 34 enhances the mixing action. When a portion of the contents of containers 14 and 16 has been dispensed, the valve 12 may be turned to the off position as indicated in FIGURES 5 through 7, inclusive. The retainers 40 around the top of the valve fit under the top flange of can 10 and holds the ball 15 in place. Retainer 40 has slot 42 therein to permit the movement of the ball valve 12 from the position shown in FIGURES 1 through 3 to that shown in FIGURES 4 through 7. When the ball valve is in the off position shown in FIGURES 4–7, the passages in ball 15 are turned outward and are completely exposed. When in the off position, the passages 22, 24 and 26 in the ball 15 can be cleaned simply by flushing out the passages 22, 24 and 26 with an appropriate solvent, such as ethylene dichloride. In this manner, provided the passages 22, 24 and 26 are cleaned after each use of the aerosol, the device of the present invention is capable of being used many times. There is no possibility of the formation of clogging residues being formed in the valve since all surfaces and passages coming in contact with mixed polymer-forming materials are completely washed by the solvent treatment. In contrast thereto, in the prior art, it was necessary to dispense all of the contents of the dispenser at one time since no means was provided for the cleaning out of passages in the valving and mixing structure.

Figure 10:
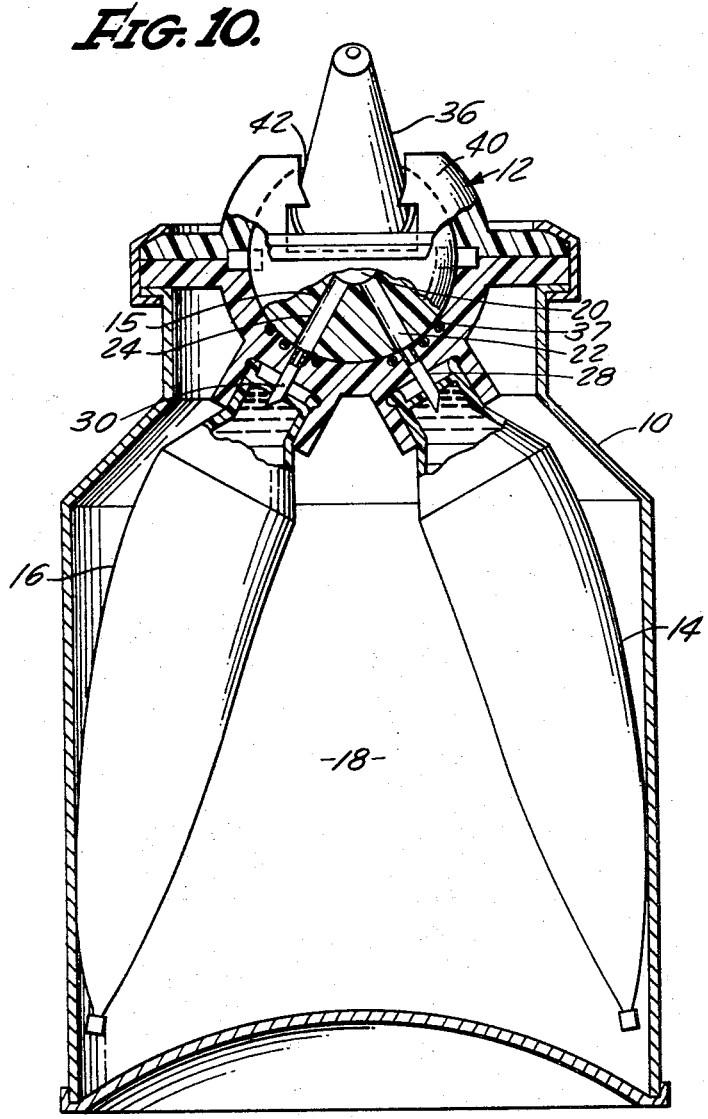
FIGURE 10 shows another embodiment of the valve and aerosol can coming within the scope and spirit of this invention.

In FIGURE 10, there is shown a different embodiment of the invention and in which the passages 26 and 32 have been eliminated. In this form of my invention, the propellant surrounding the containers 14 and 16 in can 10 is not discharged when the valve 12 is opened. Rather, the pressure of the propellant on the exterior surfaces of containers 14 and 16 is relied upon to force the contents of the containers through passages 28 and 30, and hence through the ball valve 12, and out nozzle 36. The choice of embodiment of the invention for use in any given situation is dictated primarily by the viscosity of the materials being dispensed. For ordinary thin liquid complementary reactive materials, the propellant need not be disposed in order to provide the whirlpool mixing action in vortex 34.

The different neat reactive polymer-forming materials are, in accordance with the embodiment of FIGURES 8 and 9 of my invention, forced by pressure in separate streams into a common zone where they are contacted with a high pressure gas stream, of from 1 to about 10 atmospheres, and forced in partially intermixed form into a zone where they are subjected to a swirling or whirlpool-like mixing action while still under the influence of the gas pressure, and thence discharged to the atmosphere in an essentially homogeneous state.

As used herein, the term "neat" is intended to mean that the polymer-forming materials and those normal additives for the final polymer product (colorants, stabilizers, pigments, blowing agents, plasticizers, etc.) are the only materials present in containers 14 and 16 and that no gas or propellant contacts the materials until they reach the common zone.

In general, the reactants begin to react upon contact but normally are only partially reacted at the time of discharge so that the completion of the reaction takes place outside the dispenser. Obviously, the amount of reaction taking place prior to discharge will depend upon the polymer system involved since each system has its own reaction kinetics and even these are subject to variation by adjustment of temperature, catalyst level and the like.

The propellant passing into the common mixing zone via passages 26 becomes partially entrained in the homogeneous effluent in some instances due to the viscosity and surface tension of the effluent. In this case, the entrained propellant can aid in the formation of a polymer foam such as a polyurethane. If foaming is not desired, entrainment can be minimized by adjustment of the composition and viscosity of the contents of containers 14 and 16. Of course, entrainment of propellant cannot occur in the embodiment of FIGURE 10 since the propellant does not contact the complementary reactive material. However, the device of FIGURE 10 may be utilized to dispense foam by utilizing materials in containers 14 and 16 which are mutually reactive to form foams.

The nozzle 36 functions to maintain sufficient pressure at vortex 34 in order to assure thorough mixing. The dimension of the opening at the end of the nozzle 36 is not critical. The optimum size opening is dependent upon the pressure in the aerosol, the viscosity of the polymer-forming reactants and other evident features, and can be readily ascertained by those skilled in the art by brief, simple experimentation.

This invention is particularly adapted to polyurethane foam formation. The general formulations for the two components in such a system are as follows:

| Component #1 | Parts |
|---|---|
| Organic diisocyanate | —100 |
| Organic reactive hydrogen compound | —0 to 50 |

| Component #2 | |
|---|---|
| Organic reactive hydrogen compound | —20 to 300 |
| Catalyst | —0.01 to 5 |
| Cell size control agent (surfactant) | —0 to 5 |

As will be immediately apparent to those skilled in the art, the composition of the individual components may be widely varied. For example, the one component may contain an isocyanate-terminated prepolymer and the other component may include water and a catalyst such as triethylamine. Upon mixing a portion of the one component with the other component, the polyurethane is formed in accordance with the following illustrative reaction equation:

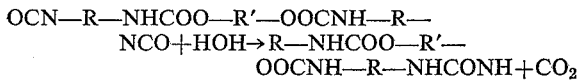

wherein R and R' are polyvalent organic radicals.

In general, upon combination of the two components, the overall NCO to OH ratio should be about 1 to 1 up to a slight excess of —NCO.

As used herein, "complementary reactive material" is intended to mean any single ingredient or mixture of ingredients, which alone will not react to form a polymer, either immediately or during storage, but which upon contact with the second component containing a complementary reactive material will thereupon react either at room temperature or under the influence of heat to provide a polymer.

As will be apparent to those skilled in the art, the containers 14 and 16 may be attached to the bottom of valve seat 33 by any suitable type of connection. Similarly, the materials for the can 10 and containers 14 and 16 may be of any type compatible with the contents thereof. Where permeation or chemical attack is a problem, the surface of one or the other of the containers and/or aerosol can may be appropriately coated.

While there has been described what is at present considered preferred embodiments of the present invention, it will be appreciated by those skilled in the art that various changes and modifications can be made therein without departing from the essence of the invention and it is intended to cover herein all such changes and modifications as come within the true spirit and scope of the appended claims. For example, the benefits of mixing by passing materials through the vortex may be had without the use of the ball valve described above. Various other valving arrangements may be used. Also, each of the materials may be passed through a vortex prior to being combined, the swirling materials combining upon contact.

I claim:

1. A novel valve apparatus comprising a valve seat having a hemispherical opening therein, received in said hemispherical opening a rotatable ball, said ball and said valve seat each having passages therethrough which can be brought into communication by rotation of said ball, the passages in said ball leading to the inlet of a common mixing zone, a common mixing zone, an outlet for said mixing zone for communicating with a vortex, a vortex having a plurality of similar spaced curved grooves running along the length of its interior surface, and a dispensing nozzle communicating with said vortex.

2. The apparatus of claim 1 wherein said ball is retained in said seat by a retainer means, said retainer means being slotted to permit the rotation of the ball and nozzle so that the passages in the ball, when the valve is in the open position, are in communication with the passages of said valve seat, and when the valve is in the closed position, the passages in said ball are accessible through said slot to permit the flow of fluid through said passages in said ball and thence out of said nozzle.

3. A novel self-contained aerosol dispenser comprising an aerosol can capable of containing a pressurizing gas, two deformable containers within said aerosol can for holding complementary reactive polymer-forming ingredients, enclosing the top of said can, a valve comprising a valve seat having a hemispherical opening therein, received in said hemispherical opening a rotatable ball, said ball and said valve seat each having passages therethrough which can be brought into communication by rotation of said ball, the passages in said ball leading to the inlet of a common mixing zone, a common mixing zone, said mixing zone communicating with a vortex, a vortex having a plurality of similar curved grooves running along the length of its interior surface, and a dispensing nozzle communicating with said vortex, one of said passages in said valve seat communicating with the interior of said can and the other passages in said valve seat communicating with said two deformable containers within said aerosol can.

4. An article of manufacture comprising an aerosol can, two pressure deformable containers within said can each containing difference complementary reactive polymer-forming ingredients, an aerosol propellant within said can for maintaining pressure on the exterior of said containers, enclosing the top of said can, a valve comprising a valve seat having a hemispherical opening therein, received in said hemispherical opening a rotatable ball, said ball and said valve seat each having passages therethrough which can be brought into communication by rotation of said ball, the passages in said ball leading to the inlet of a common mixing zone, a common mixing zone, said mixing zone communicating with a vortex, a vortex having a plurality of similar curved grooves running along the length of its interior surface, and a dispensing nozzle communicating with said vortex, two of said passages in said valve seat communicating with said two deformable containers within said aerosol can.

5. An article of manufacture comprising an aerosol can, two pressure deformable containers within said can each containing different complementary reactive polymer-forming ingredients, an aerosol propellant within said can for maintaining pressure on the exterior of said containers, enclosing the top of said can, a valve comprising a valve seat having a hemispherical opening therein, received in said hemispherical opening a rotatable ball, said ball and said valve seat each having passages therethrough which can be brought into communication by rotation of said ball, the passages in said ball leading to the inlet of a common mixing zone, a common mixing zone, said mixing zone communicating with a vortex, a vortex having a plurality of similar curved grooves running along the length of its interior surface, and a dispensing nozzle communicating with said vortex, one of said passages in said valve seat communicating with the interior of said can and the other passages in said valve seat communicating with said two deformable containers within said aerosol can.

6. The method of mixing complementary reactive polymer-forming materials which comprises forcing separate streams of different complementary reactive polymer-forming materials under pressure into a common zone to partially mix said materials, forcing said partially mixed materials under said pressure into a second zone, passing said materials while in said second zone through a vortex having a plurality of similar spaced grooves running along the lengths of its interior surface, and thereafter discharging said materials to the atmosphere in a thoroughly interblended state.

7. The method of claim 6 wherein the homogeneous materials discharged to the atmosphere are in a partially polymerized condition.

8. The method of claim 6 wherein said complementary reactive materials are polyurethane-forming materials.

9. The method of claim 6 wherein said gas pressure is from 1 to about 10 atmospheres.

10. The method of claim 6 wherein the gas pressure is provided by Freon.

11. The method of mixing complementary reactive polymer-forming materials which comprises forcing separate streams of different complementary reactive polymer-forming materials under pressure into a common zone to partially mix said materials, forcing said partially mixed materials under said pressure into a second zone, subjecting said materials while in said second zone to a whirlpool-like mixing action while still under the influence of said pressure by passing said materials through a plurality of curved channels to produce a vortex, and discharging said materials to the atmosphere in a thoroughly inter-blended state.

12. The method of claim 11 wherein the partially polymerized homogeneous discharged materials are subsequently permitted to polymerize at atmospheric pressure to complete the polymer formation.

13. A novel self-contained multi-shot aerosol dispenser comprising an aerosol can capable of containing a pressurizing gas, at least one deformable container within said aerosol can for isolating reactive ingredients, said container communicating with an outlet for said can, a mixing means mounted on said can, and valve means for regulating the amount of material passing through said mixing means, said valve means having passages for the passage of said ingredients which are accessible when said valve is closed to permit the flow of cleansing fluid through the passages to remove any of said ingredients remaining therein.

14. The apparatus of claim 13 wherein said ball is retained in said seat by a retainer means, said retainer means being slotted to permit the rotation of the ball and nozzle so that the passages in the ball, when the valve is in the open position, are in communication with the passages of said valve seat, and when the valve is in the closed position, the passages in said ball are accessible through said slot to permit the flow of fluid through said passages in said ball and thence out of said nozzle.

References Cited
UNITED STATES PATENTS

| | | | |
|---|---|---|---|
| 2,973,883 | 3/1961 | Modderno | 222—94 |
| 3,071,293 | 1/1963 | Lewis-Smith et al. | 222—135 |
| 3,198,394 | 8/1965 | Lefer | 222—135 |
| 3,236,418 | 2/1966 | Dalle et al. | 222—135 |
| 3,302,832 | 2/1967 | Hardman et al. | 222—94 |

SAMUEL F. COLEMAN, *Primary Examiner.*

H. S. LANE, *Assistant Examiner.*

U.S. Cl. X.R.

222—94, 136, 145, 148